United States Patent [19]

Guimbal

[11] Patent Number: 5,224,669
[45] Date of Patent: Jul. 6, 1993

[54] LANDING GEAR FOR AN AERODYNE, WITH ARCHES IN COMPOSITE MATERIAL

[75] Inventor: Bruno Guimbal, Les Milles, France

[73] Assignee: Aerospatiale Societe Nationale Industrielle, Paris, France

[21] Appl. No.: 875,499

[22] Filed: Apr. 29, 1992

[30] Foreign Application Priority Data

May 6, 1991 [FR] France .................. 91 05525

[51] Int. Cl.$^5$ ............................................. B64C 25/52
[52] U.S. Cl. .............................. 244/108; 244/100 R; 244/17.17
[58] Field of Search ............ 244/100 R, 108, 109, 244/104 R, 104 LS, 17.11, 17.17

[56] References Cited

U.S. PATENT DOCUMENTS

| 3,144,223 | 8/1964 | Nichols ........................ 244/104 R |
| 4,270,711 | 6/1981 | Cresap et al. ................ 244/100 R |
| 4,544,116 | 10/1985 | Shwayder ..................... 244/108 |
| 4,558,837 | 12/1985 | Mens et al. .................... 244/108 |
| 4,645,143 | 2/1987 | Coffy ............................. 244/100 R |

FOREIGN PATENT DOCUMENTS

| 1272208 | 10/1960 | France . |
| 1272208 | 10/1960 | France ........................ 244/108 |
| 1578594 | 8/1969 | France . |
| 2372081 | 6/1978 | France ........................ 244/108 |

Primary Examiner—Sherman Basinger
Assistant Examiner—Christopher P. Ellis
Attorney, Agent, or Firm—Nikaido, Marmelstein, Murray & Oram

[57] ABSTRACT

The landing gear for an aerodyne, and especially for a helicopter (H), is of the type including lateral members (4) for contact with the ground, such as skids, skis, floats or similar members. The members (4) are linked to the fuselage of the aerodyne (H) by at least two crosspieces (2, 3) of composite material. The crosspieces are produced in a laminated material having high elastic absorption capacity. They have a sharply curved shape in the area of their central parts by which they are linked to the fuselage of the aerodyne (H), the link (5) between each of the crosspieces (2, 3) and the fuselage being a link with longitudinal embedding with respect to the aerodyne. The lateral members (4) for contact with the ground are linked to the crosspieces (2, 3) by means of articulation (17, 18) which allow large deformations of the crosspieces (2, 3) without torsion of the lateral members (4).

20 Claims, 5 Drawing Sheets

LANDING GEAR FOR AN AERODYNE, WITH ARCHES IN COMPOSITE MATERIAL

FIELD OF THE INVENTION

The subject of the present invention is a landing gear for an aerodyne, especially for a helicopter. The landing gear proposed by the invention is of the type with skids whose arches or crosspieces are produced in a composite material. It is particularly adapted for equipping helicopters of the light type.

Conventionally, landing gears with skids or similar contact members, such as skis, floats, etc., mainly comprise two such members, linked together and to the fuselage of the aerodyne by two crosspieces in the shape of arches, whose lateral branches bear on the skids, which are themselves provided to come into contact with the surface receiving the aerodyne. In the present description, the term "arch" or "crosspiece" will be used indiscriminately to describe this part of the landing gear. In the case of a helicopter, especially, these crosspieces can also be associated with hydraulic dampers intended to damp the oscillations permitted by the landing gear when the aircraft is on the ground and the rotor is turning, so as to avoid the cabin of the helicopter entering into resonance on its landing gear.

On landing, the impact energy is absorbed by elastic and plastic deformation of the legs of the crosspieces and of the links between the fuselage of the helicopter and the crosspieces. Currently, these legs are produced in steel or in another alloy chosen for its good deformation properties.

This type of landing gear is not without certain drawbacks. In particular, it is common for landings at high vertical speeds, or "hard" landings, to plastically deform crosspieces and skids, which it then becomes necessary to replace. Moreover, if the alloys in which these crosspieces are produced are chosen for their high deformation on fracture, on the other hand, the forces which they resist are rapidly saturated in the plastic phase, such that the slightest landing at a slightly too high speed transmits to the cabin of the aerodyne a load factor close to the saturation value and appears "hard", especially where a cabin of low mass is involved. Equally, these landing gears can undergo a significant corrosion, which requires them to be changed regularly. Furthermore landing gears of this type have high elastic stiffness when the aerodyne is on the ground. The abovementioned anti-ground-resonance dampers which are associated with them are called on to operate over very short travel which compromises their effectiveness.

DESCRIPTION OF THE PRIOR ART

In order to remedy the drawbacks of metal gears with skids, it has already been proposed to produce the crosspieces of the undercarriages in composite materials. By way of example, mention may be made especially of the landing gear described in the French patent of the applicant published under number 2,554,210, whose crosspieces are flexible beams in laminated composite material. These beams are constituted by sole plates, linked in pairs by webs which are perpendicular to them. These beams are associated with elastomeric blocks interposed between the sole plates and intended to partly absorb the deformation energy of the sole plates when the beams are loaded on landing.

Another document illustrating the prior art is the U.S. Pat. No. 4,270,711, which describes a landing gear with skids for helicopters whose crosspieces have the shapes of arches. The front crosspiece of the landing gear is fixed at two points to the fuselage of the helicopter, the rear crosspiece being articulated on the fuselage by a pivot link which is offset with respect to the median fiber of the crosspiece. However, this document makes no mention of the material in which the crosspieces are produced. The skid-crosspiece link is a conventional link with rigid embedding and the heavy deformations on hard landings are essentially absorbed by the rear crosspiece/fuselage link. The architecture of the landing gear of the U.S. Pat. No. 4,270,711 does not permit any braking of the rebound by the landing gear by horizontal displacement of the skids or contact members under the effect of the deflection of the crosspieces in the course of a landing.

GENERAL DESCRIPTION OF THE INVENTION

The subject of the present invention is a landing gear of novel design for an aerodyne, advantageously for a helicopter, by virtue of the original embodiment of the crosspieces or arches and also the architecture of the gear, which comprises improved links between crosspieces and skids and between crosspieces and fuselage, so as to obtain an optimum behavior of the aircraft in the case of a "hard" landing, even during a sliding or scraping landing.

Thus the subject of the present invention is a landing gear for an aerodyne, and especially for a helicopter, of the type comprising lateral members for contact with the ground, such as skids, skis, floats or similar members, the members being linked to the fuselage of the aerodyne by at least two arches or crosspieces in composite material, wherein the crosspieces are produced in a laminated material having high elastic absorption capacity and wherein they have a sharply curved shape in the area of their central parts by which they are linked to the fuselage of the aerodyne, the link between the crosspieces and the said fuselage being a link with longitudinal embedding with respect to the aerodyne, the said members for contact with the ground being linked to the crosspieces by means of articulation which allow large deformations of the crosspieces without torsion on the lateral members.

The landing gear according to the invention, with skids or similar contact members, in which the crosspieces are in composite material, is of a novel type. In particular, the crosspieces have the shapes of very sharply curved arches and are in laminated composite materials constituted by high-strength fibers agglomerated by a thermosetting synthetic resin, which have a high elastic absorption and deformation capacity. During a landing, such crosspieces deform elastically in deflection over a range of deformation which is much greater than those constituted with a metal material, so that the vertical deformation of the crosspieces is accompanied by a horizontal displacement of their extremities. This horizontal displacement of the extremities of the crosspieces or arches permits, by friction between the skids or similar contact members and the ground, an effective damping of the whole of the landing movement and especially of the rebound, while the vertical deformation of the crosspieces translates the absorption of kinetic energy of descent of the aerodyne. It should be noted that this general shape with sharp curvature of the crosspieces makes it possible to considerably reduce the normal stresses to which the materials in which they are produced are subjected.

In order to ensure a good mechanical behavior of the assembly of the landing gear, especially in the heavy loadings in torsion of the skids and crosspieces during sliding or scraping landings, the invention proposes a general landing gear architecture in which, in contrast with conventional architecture, the two crosspieces of the landing gear are free to move transversely but are embedded longitudinally with respect to the fuselage of the aerodyne, while the skids or the similar members for contact with the ground are linked to the crosspieces by articulated links which allow large deformations of the crosspieces without torsion on the members for contact with the ground. The deformations and differences in deformations which can appear on the crosspieces of the same gear, according to the landing situations, in fact render any rigid crosspieces/skids link impossible. Thus, for example, a "hard" rear landing in which only the rear crosspiece or arch is deformed can introduce a rotation of 20° of the extremity of the crosspiece with respect to the skid.

Equally, so as to give the helicopter good lateral equilibrium when supported on the ground, at least one of the two crosspieces (and preferably both) is linked to the fuselage of the aerodyne at at least two points on either side of the longitudinal plane of symmetry. The invention proposes, in a particularly advantageous fashion, to produce these two links by the use of attachments which are pivoting around axes which are parallel to the longitudinal axis of the aerodyne and offset with respect to the crosspiece or arch with which they are associated. This offset is chosen such that the elongation of the crosspiece at its central part between the two attachments during deflection of the arch in the course of a landing is compensated for by the rotation of the attachments around the fixing axes. This complementary characteristic is all the more necessary in order to avoid center-to-center variation in the arch-fuselage links, in the case of crosspieces with great curvature and high elasticity, that a large part of the landing energy is absorbed by the deformation of this central part. Needless to say, these two pivoting links also provide, during sliding or scraping landings, the angular rotation of the legs of the arch under load.

Advantageously, the crosspieces are flexible blades produced in a laminated composite material. The main material in which the crosspieces are produced in order to provide their strength in deflection and in traction/compression is preferably a bundle of glass fiber impregnated with thermosetting synthetic resin and stacked unidirectionally. In order to stiffen it in torsion, this bundle can be sheathed by a skin of woven glass fibers impregnated with thermosetting resin, whose fibers are crossed with respect to the unidirectional fibers of the bundle. Thus, the glass fibers of the skin which sheaths the bundle of glass fibers can, for example, be oriented at plus or minus 45° with respect to the unidirectional fibers of the bundle.

Preferably, the crosspieces are of changing cross-section which is optimized for a better distribution of the stresses in vertical deflection and in horizontal deflection. They can also have a tapered cross-section, especially a substantially elliptical cross-section. Their cross section can decrease from their central part towards their extremities. They are produced especially by stacking of unidirectional fibers with progressive stopping of one part of these fibers, so as to produce the changing, constant-stress cross-section. The stopped fibers are then fibers close to the central fibers of the crosspieces.

The assembly of the crosspiece thus constituted in the humid state is deposited in a shaped mold and heat is applied under pressure in order to produce the polymerization of the agglomeration resin of the fibers.

Also preferably, the crosspiece arranged at the front of the aerodyne is substantially in an arc of a circle; the crosspiece arranged at the rear of the aerodyne is substantially parabolic.

Advantageously, a link between one crosspiece and the fuselage of the aerodyne is produced by use of two yokes, in which the crosspiece is embedded in the region of its central part, each of these two yokes being articulated onto the fuselage of the aerodyne by a pivot link around a shaft which is longitudinal with respect to the aerodyne. The axes of pivoting articulation of the yokes are preferably offset with respect to the neutral fiber of the crosspiece carried by the yokes. Such a yoke can be produced in a metal material bonded onto the crosspiece with which it is associated or in a composite material overmolded onto the crosspiece.

Preferably, the means of articulation between a crosspiece and a skid or similar contact member comprise a stirrup linked to the contact member and integrally fixed to one of the extremities of the crosspiece, especially by use of an elastomeric sheath polymerized onto the crosspiece, and onto one wall of the stirrup. The stirrups associated with the rear crosspiece of the landing gear can be able to pivot with respect to the members for contact with the ground on which they are mounted around axes which are substantially perpendicular to the members and which extend along a direction which is substantially radial with respect to the rear crosspiece. Advantageously the means of articulation between the crosspieces and the members for contact with the ground also comprise anti-wear shoes which partially surround the contact members in line with the crosspieces and in the region of their parts by which they are intended to be in contact with the ground. The anti-wear shoes associated with the front crosspieces of the landing gear are integrally fixed to the linking stirrups associated with the front crosspiece, while the anti-wear shoes associated with the rear crosspiece are linked to the stirrups associated with the rear crosspiece by a link which allows their relative pivoting around the stirrup/member for contact with the ground pivoting axis. The rear crosspiece can also be linked to the fuselage of the aerodyne by use of anti ground-resonance dampers.

BRIEF DESCRIPTION OF THE DRAWINGS

The description which follows of a possible embodiment of the invention is purely illustrative and not limiting. It must be read with respect to the attached drawings in which.

DESCRIPTION OF PREFERRED EMBODIMENTS

Figure 1:
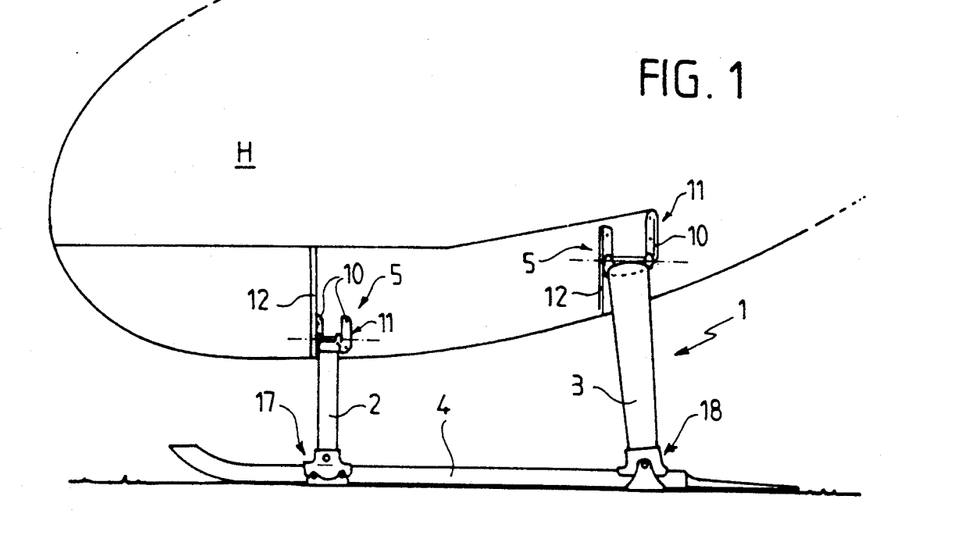
FIG. 1 is a diagrammatic side view of a helicopter equipped with the landing gear of FIG. 1A.
Figure 1A:
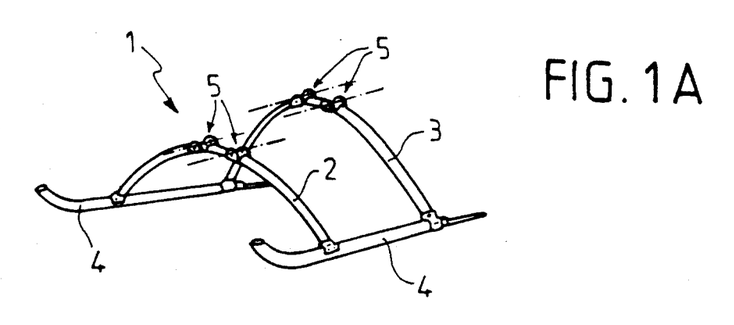
FIG. 1A is a diagrammatic representation in perspective of a landing gear in accordance with the invention.
Figure 2:
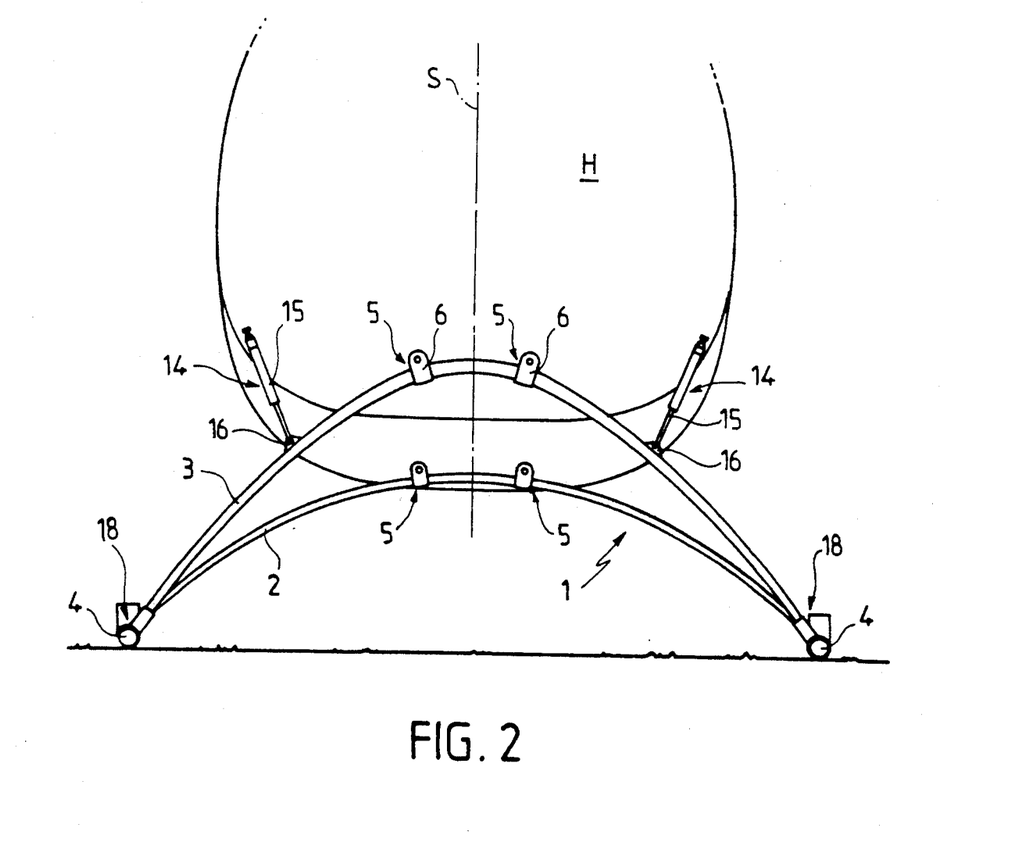
FIG. 2 is a rear view of the helicopter of FIG. 1.

Referring more particularly to FIGS. 1A, 1 and 2, a landing gear 1 is seen, mounted on an aerodyne H, of the helicopter type, comprising essentially two crosspieces 2 and 3 mounted on the aircraft H on either side of the center of gravity of the latter. The crosspiece 2 is arranged forward on the aircraft H and the crosspiece 3 at the rear. These crosspieces 2 and 3 are mechanically linked, in the region of their extremities, to two lateral skids 4 intended to serve as members for contact with the ground. These two skids 4 are two conventional tubular skids in light alloy. They could, needless to say, be replaced by other similar members for contact with ground, such as skis or floats.

Each of the two crosspieces 2 and 3 is a sharply curved arch produced in a composite material in glass fiber described below in more detail with reference to FIGS. 8 and 9. The front crosspiece 2 mainly has the shape of an arc of a circle, while the rear crosspiece 3 has a parabolic shape. These embodiment shapes are only examples.

Thus, the crosspiece 2 can also have a parabolic shape. The invention is defined in fact by a clearly accentuated arched shape given to the crosspieces.

Each of these two crosspieces 2 and 3 is linked to the fuselage structure of the helicopter H by two links each designated 5. These links 5 embody a longitudinal embedding of the crosspieces 2 and 3 with respect to the fuselage of the helicopter H: they oppose any movement of the central parts of the crosspieces 2 and 3 along a longitudinal direction with respect to the aircraft H. The front and rear links 5 are similar.

The rear crosspiece 3 is also linked to the fuselage of the helicopter H by two small hydraulic dampers 14 distributed symmetrically on either side of the longitudinal plane S of symmetry of the fuselage of the helicopter H and of its landing gear 1. The link between a damper 14 and the rear crosspiece 3 is produced by articulation of the free extremity of the rod 15 of the damper 14 on a lug 16 which equips and projects from the crosspiece 3. The main body of the damper 14 is for its part articulated, at its extremity opposed to the free extremity of the rod 15, onto the fuselage of the helicopter H.

The links between the extremities of the crosspieces 2 and 3 and the skids 4 are produced by means of articulation designated respectively by 17 and 18.

Figure 3:
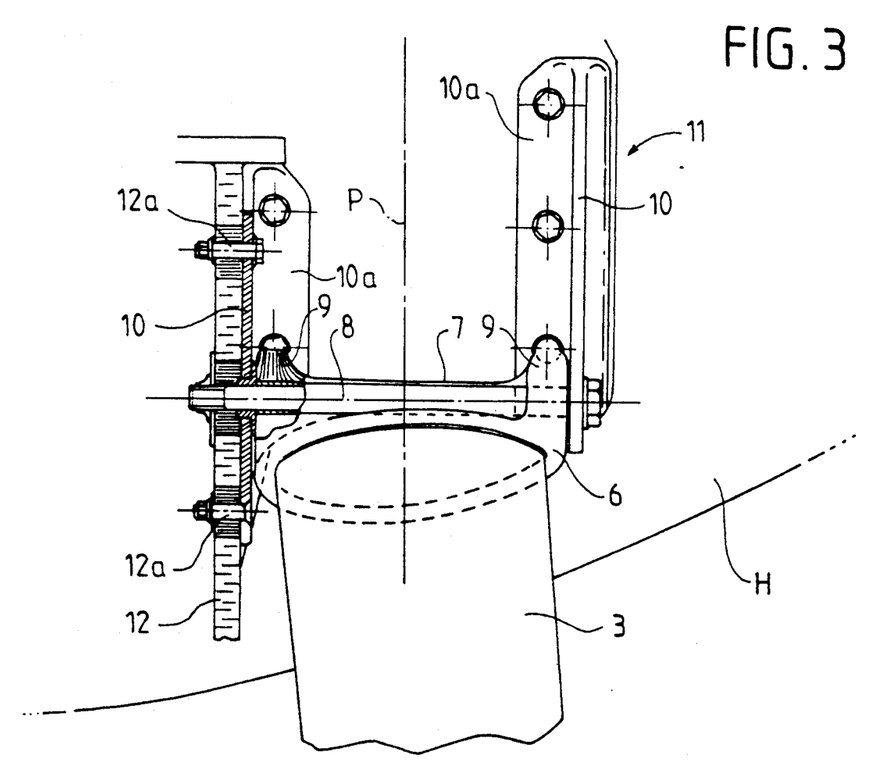
FIG. 3 is a sectional view of a detail of the link between the rear crosspiece of the landing gear and the fuselage of the helicopter of FIGS. 1 and 2.

Referring more particularly to FIG. 3 representing a detail of one of the two links 5 linking the rear crosspiece 3 to the structure of the fuselage of the helicopter H, it is seen that such a link is principally produced by use of a yoke 6 having an internal shape which substantially follows the external shape of the crosspiece 3. This embedding yoke 6 is traversed by a cylindrical hollow 7 which is radially offset with respect to the crosspiece 3 and is intended to receive a shaft 8 for fixing and pivoting, which is a screw extending longitudinally with respect to the fuselage of the helicopter H. The axis of this screw 8 and of the hollow 7 is offset above the neutral axis of the crosspiece 3. At its upper part, that is to say that intended to be the furthest from the extremities of the crosspiece 3 which the skids 4 carry, the yoke 6 is laterally reinforced, on either side of the median plane P of the link 5, by reinforcing shoulders 9 which protrude with respect to the median part of the yoke 6. These shoulders 9 are intended to come to abut against two plates 10 together delimiting a central casing structure 11 and providing the longitudinal embedding of the yoke 6. These plates 10, perpendicular to the longitudinal direction of the fuselage of the helicopter H, are integrally fixed to the fuselage by screwing on the one hand of lateral edges 10a at L or T which terminate the plates 10 in the region of their contour portions which are found in the region of the fuselage, and, on the other hand, of the front plate 10 of the casing 11 onto a beam or plate 12 forming a linking lug which is integral with the fuselage of the helicopter H and projects with respect to the fuselage. This beam 12 is also perpendicular to the longitudinal direction of the aircraft H. It is solidly fixed to the front plate 10 by four screws 12a which are parallel to the axis of the screw 8 and distributed in a square around the latter. The screw 8 passes through the two plates 10, and the plate 12. Its head bears on the rear face of the rear plate 10. Its opposite extremity is threaded and projects with respect to the front face of the beam 12, its thread interacting with the complementary thread of a nut 13 which bears on the front face of the beam 12, in order to maintain the screw 8 and the yoke 6 in place on the casing 11.

Figure 4:
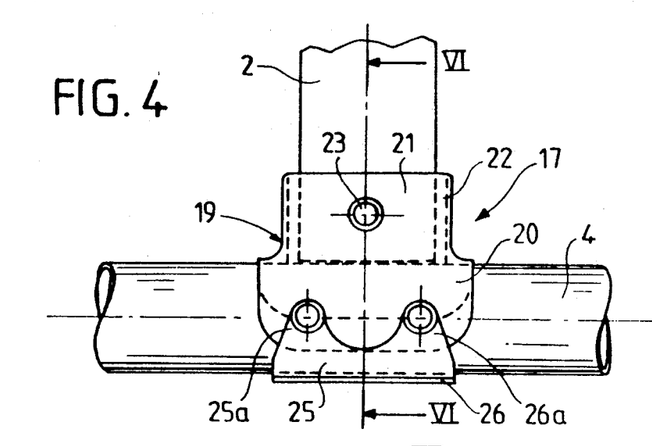
FIGS. 4 and 5 are side views of details of the links between the skids or contact members of the landing gear in accordance with the invention and respectively the front and rear crosspieces of the landing gear.
Figure 6:
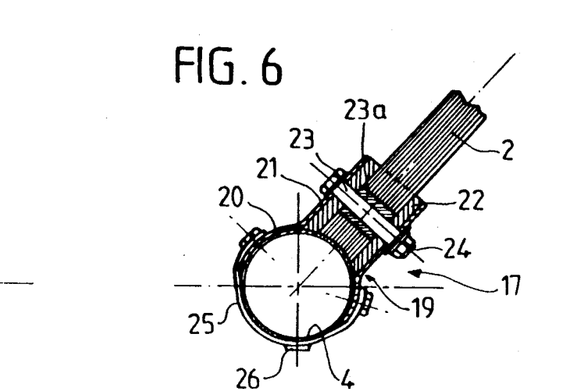
FIGS. 6 and 7 are sectional views along respectively lines VI—VI and VII—VII of FIGS. 4 and 5.

As can be seen more particularly in FIGS. 4 and 6, the means 17 producing the articulated link between the front crosspiece 2 and the skids 4 essentially comprise a stirrup 19, one part 20 of which forming a saddle substantially follows the shape of the skid 4 with which the stirrup 19 is associated, over a small portion of the length of the skid 4 and over substantially a half cross-section of the latter. This part 20 forming a saddle is prolonged in its median part by a sleeve 21 intended to receive one extremity of the crosspiece 2. This sleeve 21 has an inner shape which corresponds substantially to that of the crosspiece 2 in the region of this extremity. It is integrally fixed to the crosspiece 2 by an elastomeric sheath 22 polymerized to the internal shape of the sleeve 21 and to the shape of the crosspiece 2 between which it is interposed. The extremity of this crosspiece 2 is in contact with the skid 4, and it substantially follows the shape of the contact face of the skid. The sleeve 21 and thus the stirrup 19 are in addition integrally fixed to the crosspiece 2 by use of a screw 23 which extends through the crosspiece 2 by passing through the walls of the sleeve 21 and of the sheath 22. This screw 23 is perpendicular to the direction along which the skid 4 with which it is associated extends, and to the median axis of the sleeve 21 and of the sheath 22. The head of this screw 23 bears on an external face of the sleeve 21, the extremity of the screw 23 opposite its head being threaded and projecting outside the sleeve 21. Its thread cooperates in the region of this extremity with the complementary thread of a nut 24 making it possible to clamp the sleeve 21 between the head of the screw 23 and the nut 24.

The means of articulation 17 further comprise an anti-wear shoe 25 also in the form of a saddle which surrounds the skid 4 in such a way as to be complementary to the part 20 of the stirrup 19. This anti-wear shoe 25 is equipped, in the region of its face intended to be in contact with the ground, with a longitudinal contact protuberance 26. This shoe 25 and the stirrup 19 are integrally fixed to the skid 4 by the use of four screws arranged in the area of lugs 25a by which the shoe 25 substantially covers the part 20 which is in the shape of a saddle.

Figure 5:
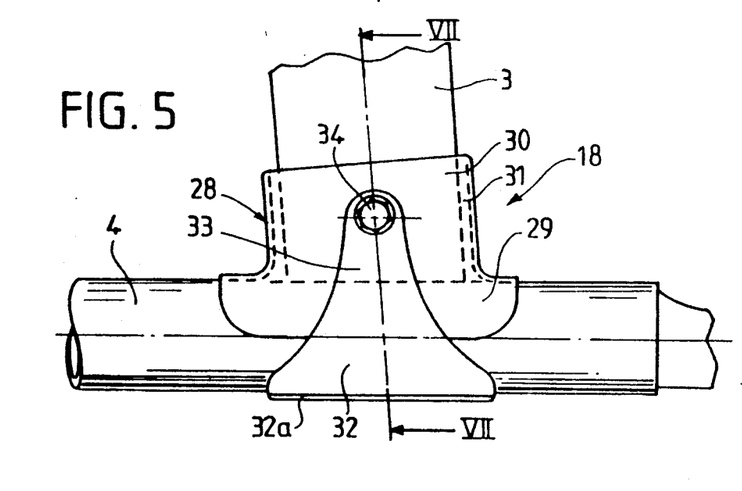
Figure 7:
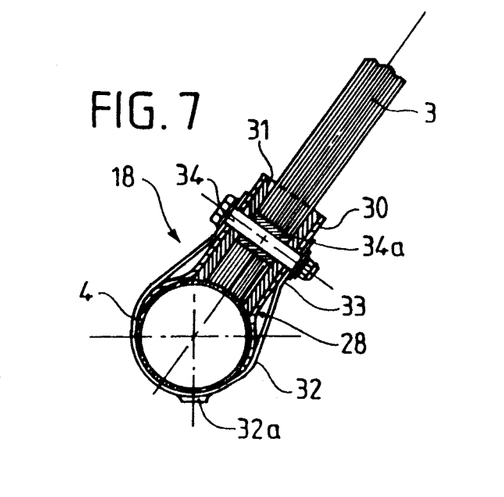

Referring now to FIGS. 5 and 7, it is seen that the means of articulation 18 linking the skids 4 and one extremity of the crosspiece 3 comprise a stirrup 28 which is substantially similar to the stirrup 19 described above, since it comprises a part forming a saddle 29 and a sleeve part 30 receiving the extremity of the crosspiece 3. This sleeve part 30 is associated with an elastomeric sheath 31 polymerized to the shape of the crosspiece 3 and to the internal shape of the sleeve 30. The means 18 also comprise an anti-wear shoe 32 equipped with a contact protuberance 32a and partially surrounding the skid 4 with which it is associated, in such a fashion as to complement the part forming a saddle 29. This shoe 32 is terminated on either side of the skid 4 with which it is associated by a branch 33 which partially covers the stirrup 28 in the region of which it is superimposed at its part which forms a saddle 29 and on a part of the sleeve 30. This shoe 32 is integrally fixed to the sleeve 30 and to the crosspiece 3 by use of a screw 34 which passes through the branches 33 through their thickness, the walls of the sleeve 30 and of the elastomeric sheath 31, as well as the crosspiece 3. The head of the screw 34 bears on one of the branches 33, while the threaded extremity of the screw 34 protruding with respect to the other of the lugs cooperates with a nut which produces clamping of the lugs 33 of the shoe 32 and of the sleeve 30.

The screws 23 and 34 are each associated with an elastomeric protection fitting, designated respectively by 23a and 34a, interposed between the screw 23 or 34 and the faces of the recess of the crosspiece 2 or 3 which receives it.

Thus, each stirrup 19 is integrally fixed to the skid 4 with which it is associated, while these stirrups 28 are mounted pivotably around the axes of the screws 34, on the skids 4 with which they are associated.

Figures 8, 9:
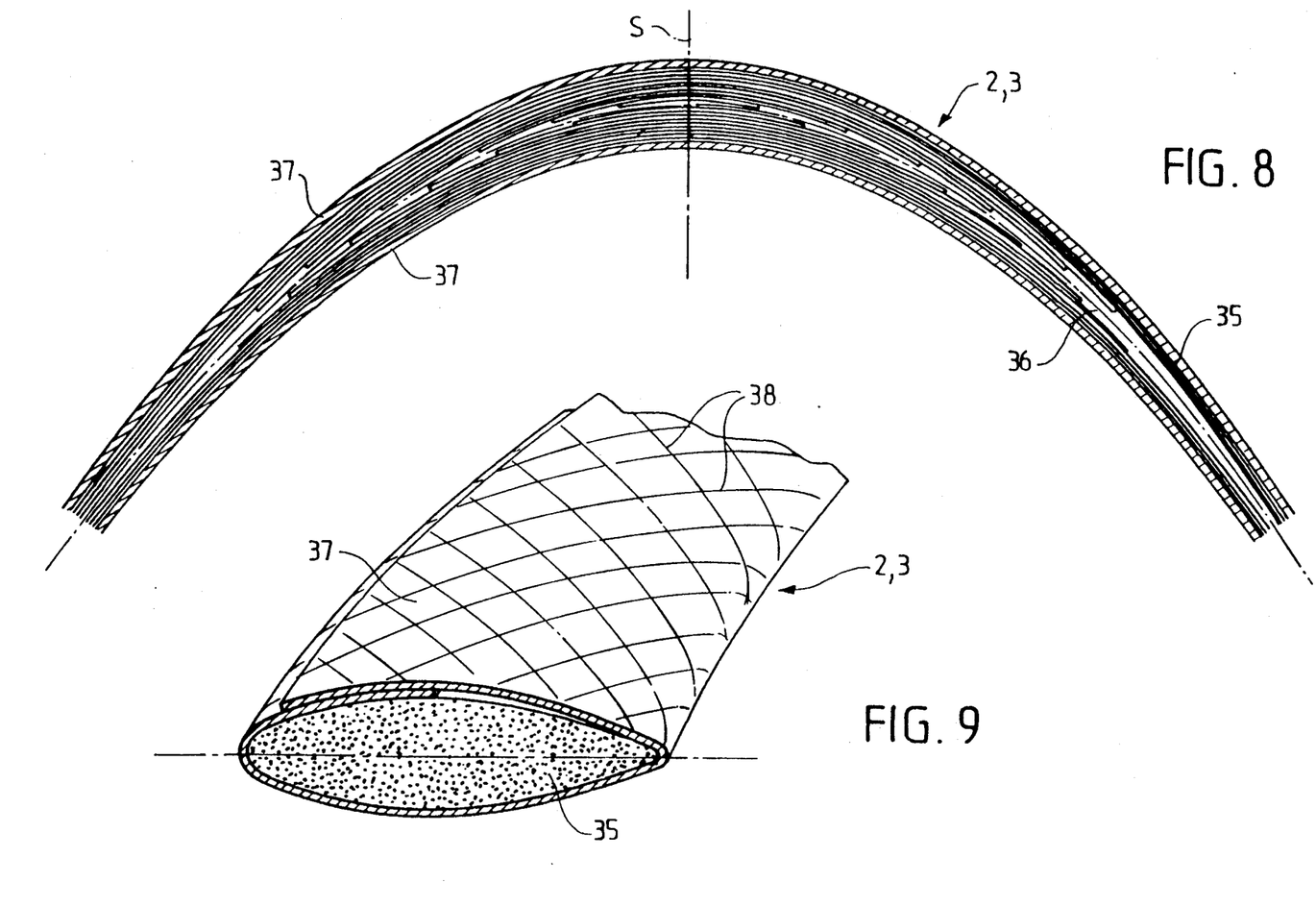
FIG. 8 is a sectional view along the line VIII—VIII of FIG. 1 of the rear crosspiece of the landing gear in accordance with the invention.
FIG. 9 is a diagrammatic view in section and in perspective with a cutaway of a detail of a front or rear crosspiece of the landing gear in accordance with the invention.

Referring now more particularly to FIGS. 8 and 9, it is seen that each crosspiece 2 or 3 is a flexible blade of changing, elliptical cross-section adapted in order to optimize its longitudinal and transverse flexibility and to also give it optimum mass. Each crosspiece 2 or 3 is produced as a bundle 35 of glass rovings impregnated with epoxy resin, the roving being stacked unidirectionally with progressive stopping of a part of them in order to produce the variation of cross-section of the crosspiece 2 or 3. The stopped rovings are preferably the central rovings close to the neutral or median fiber 36 of the cross-piece, so as to limit starting points for fractures. This bundle of glass fiber rovings is surrounded by a skin 37 of glass fabric whose threads 38 are woven with an orientation at plus and minus 45° with respect to the direction of the fibers of the layers 35. This skin of glass fabric 37 makes it possible to improve the stiffness and the torsional strength of the crosspieces 2 and 3.

A comparison table is given below (Table 1) of the parameters of elastic and plastic behavior of materials conventionally used up to the present to produce landing gears, as well as of the bundle of rovings of glass fibers agglomerated by hot-polymerized epoxy resin proposed by the invention.

TABLE 1

|  | Steel | Aluminum alloy | Bundle of fibers of glass/epoxy resin |
|---|---|---|---|
| Density | 7.8 | 2.8 | 2.1 |
| Modulus (hb) | 20000 | 7000 | 5500 |
| Elastic (hb) | 120 | 30 | 160 |
| Elastic W (kj/kg) | 0.46 | 0.23 | 11.4 |
| Rupture (hb) | 138 | 48 | 160 |
| Elongation | 13% | 10% | 2.9% |
| Plastic W | 20.5 | 13.4 | — |
| Total W (kj/kg) | 21 | 14 | 11.4 |

IT clearly emerges from this table that the elastic absorption capacity of the bundle of glass fibers proposed by the invention is much better than that of metal alloys in which gears are conventionally produced. Also, it is noted that the useful elongation of the bundle of glass fibers, which is 2.9% instead of 13% for steel, makes it possible to produce the cross-pieces with much flatter cross-sections, which reduces the aerodynamic drag of the landing gear accordingly.

Figure 10:
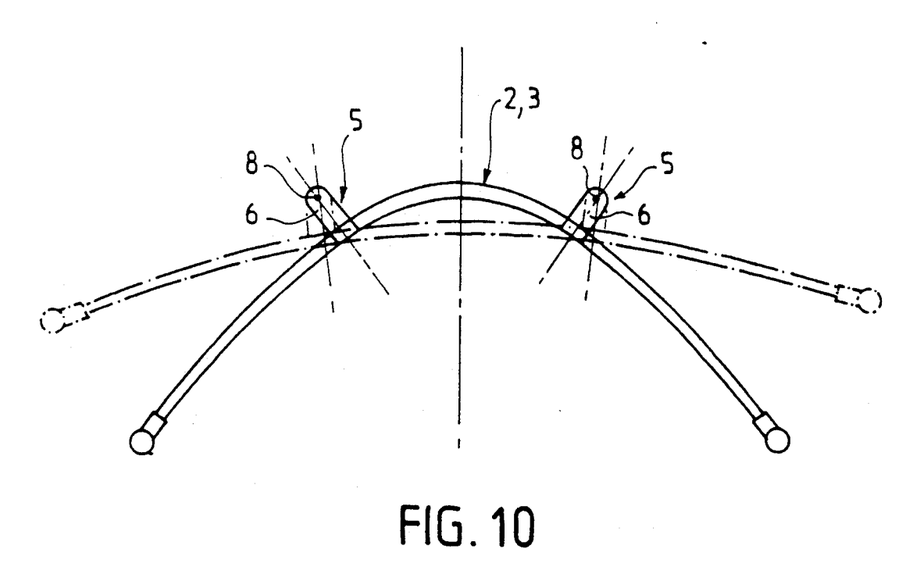
FIGS. 10 and 11, finally, diagrammatically illustrate the behavior in deflection loadings of crosspieces of a landing gear according to whether these crosspieces are articulated at two points onto the fuselage of the aerodyne with which they are associated, respectively with or without offset of their articulation axis with respect to their median fiber.
Figure 11:
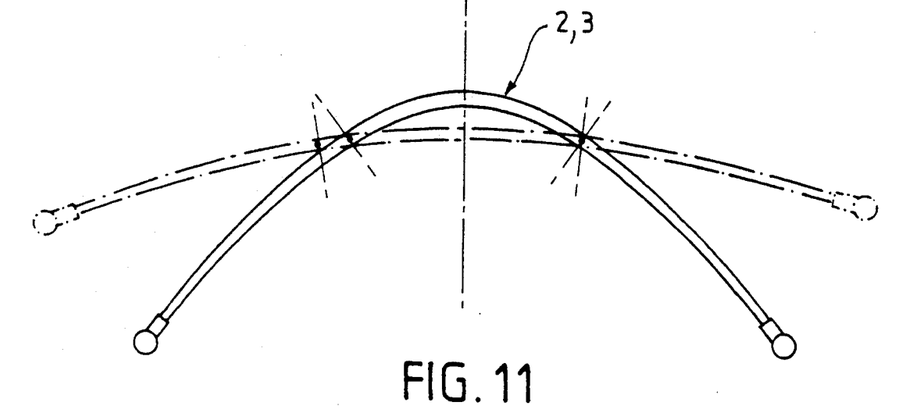

During a landing, the kinetic energy of descent is absorbed by the deformation in deflection of the crosspieces 2 and 3. Such a deformation has been represented diagrammatically in dots and dashes on FIG. 10. The rebound is braked by virtue of the horizontal movement of the skids 4 on the ground, while the vertical deformation of the crosspieces 2 or 3 corresponds to the variation in kinetic energy of the aircraft H. The landing gear architecture which has just been described makes it possible to optimize the energy absorption by the crosspieces, for large deformations of the latter. In particular, a significant part of the landing energy is absorbed by the portion of the crosspieces 2 and 3 which is situated between the articulations 5 and the offset arrangement of the shafts 8 of the articulations 5 makes it possible to compensate for the elongation of the crosspieces by the yokes 6 around their shafts 8. As has been illustrated especially in FIGS. 10 and 11, it is seen that the offset of the shafts (FIG. 10) makes it possible not to vary the center-to-center distance of the fixing means 5, while in the case of fixing means without offset (FIG. 11) the deflection of the arch gives rise to a significant center-to-center variation which loads the fuselage of the helicopter. Moreover, the link 18 between the skids 4 and the crosspiece 3 permits angular movements between the crosspiece 3 and the skids 4, linked in angle to the crosspiece 2 by the link 17.

It should be noted that the architecture of the landing gear which has just been described is particularly adapted to aerodynes of a light type, such as helicopters of small size, with a monocoque structure. It especially permits, on these aircrafts, crosspiece-fuselage links close to the axis of the aircraft, as well as low drag of the landing gear. Moreover, the energy absorbed by the gear in accordance with the invention is 3 to 4 times greater, for constant mass, than that absorbed by landing gears of the conventional type, the useful travel in deflection of the landing gear being maximized by virtue of the architecture proposed by the invention. In particular, this architecture makes it possible to avoid the permanent deformations on hard landings which appear on conventional landing gears, the load factors on landing transmitted to the cabin of the aerodyne being much smaller than with conventional landing gears.

The numerals inserted after the technical characteristics mentioned in the claims have the sole aim of facilitating the understanding of the latter, and do not in any way limit its scope.

What is claimed is:

1. A landing gear for an aerodyne of a type comprising:
   lateral members for contact with the ground; and
   at least two crosspieces of composite material, said lateral members being linked to a fuselage of the aerodyne by said at least two crosspieces, wherein said crosspieces are flexible blades produced in a laminated material having high elastic absorption capacity, said composite material constituted by high strength fibers agglomerated with a synthetic resin and wherein said crosspieces have a sharply curved shape in an area of respective center parts by which said crosspieces are linked to the fuselage of the aerodyne, each of said crosspieces linked to said fuselage by means of longitudinal embedding with respect to said aerodyne, said means of longitudinal embedding including two yokes into which said crosspieces is embedded in said area of said central part, each of said two yokes articulated onto said fuselage of said aerodyne by a pivot link around a shaft which is longitudinal with respect to said aerodyne, the lateral members for contact with the ground being flexibly linked to said crosspieces by means of articulation, said means of articulation for allowing large deformations of said crosspieces without torsion on said lateral members, said means of articulation between said crosspiece and said lateral contact member including a stirrup flexibly linked to said lateral contact member and integrally fixed to one of the extremities of said crosspiece by use of an elastomeric sheath which is polymerized into said crosspiece and onto inner walls of said stirrup.

2. The landing gear as claimed in claim 1, wherein the high-strength fibers constituting the flexible blades are glass fibers.

3. The landing gear as claimed in one of claims 1 or 2, wherein the synthetic resin which agglomerates the high-strength fibers constituting the flexible blades is a thermosettable synthetic resin of epoxy type.

4. The landing gear as claimed in one of claims 1 or 2, wherein the flexible blades comprise a central hub formed by a bundle of rovings of unidirectional fibers arranged longitudinally along the span of the blades and an envelope for stiffening in torsion formed by fabrics in composite whose threads are oriented at 45° with respect to the longitudinal axis of the blades.

5. The landing gear as claimed in claim 1, wherein the crosspieces are of changing cross-section which is optimized for a better distribution of the stresses in vertical deflection and in horizontal deflection.

6. The landing gear as claimed in claim 5, wherein the crosspieces have a tapered cross-section.

7. The landing, gear as claimed in any one of claims 5 or 6, wherein the crosspieces have a substantially elliptical cross-section.

8. The landing gear as claimed in any one of claims 5 or 6, wherein the crosspieces are of decreasing cross-section from said central part toward each extremity thereof.

9. The landing gear as claimed in claim 8, wherein the bundles constituting the crosspieces are produced by stacking of unidirectional fibers with progressive stopping of a part of said fibers, so as to produce the changing cross-section of said crosspieces.

10. The landing gear as claimed in claim 9, wherein the stopped fibers are fibers close to the central fibers of the crosspieces.

11. The landing gear as claimed in claim 5, wherein the crosspiece arranged at the front of the aerodyne is made substantially in an arc of a circle.

12. The landing gear as claimed in claim 5, wherein the crosspiece arranged at the rear of the aerodyne is substantially parabolic.

13. The landing gear as claimed in claim 1, wherein the axes for pivoting articulation of said yokes are offset with respect to the neutral fiber of the crosspiece carried by said yokes.

14. The landing gear as claimed in one of claims 1 or 13, wherein said yokes are produced in a metal material bonded onto the crosspiece with which it is associated.

15. The landing gear as claimed in claim 1, wherein a yoke is produced in composite material overmolded onto said crosspiece.

16. The landing gear as claimed in claim 1, wherein the stirrups associated with the rear cross-piece piece of said landing gear are able to pivot with respect to the lateral members for contact with the ground on which they are mounted around shafts which are substantially perpendicular to said lateral members and extend in a direction which is substantially radial with respect to said rear crosspiece.

17. The landing gear as claimed in any one of claims 1 or 16, wherein the means of articulation between the crosspieces and the lateral members for contact with the ground also comprise anti-wear shoes which partially surround said contact members in line with said crosspieces and in a region intended to be in contact with the ground.

18. The landing gear as claimed in claim 17, wherein the anti-wear shoes associated with the front crosspiece of said landing gear are integrally fixed to the linking stirrups associated with said front crosspiece, while the anti-wear shoes associated with the rear crosspiece are linked to the stirrups associated with said rear crosspiece by a link which allows relative pivoting around both the stirrup and the lateral member for contact with the ground pivoting axis.

19. The landing gear as claimed in claim 1, wherein the rear crosspiece is also linked to the fuselage of the aerodyne by use of anti-ground-resonance dampers.

20. The landing gear as claimed in claim 1 wherein said aerodyne is a helicopter.

* * * * *